Aug. 14, 1951  C. G. ROPER ET AL  2,564,175
ELECTRONIC MEASUREMENT MEANS AND CONTROL DEVICE
Filed April 16, 1946  6 Sheets-Sheet 1

INVENTOR.
Charles G. Roper.
BY Arno G. K. Wilkens.
Darby & Darby.
Att'ys.

INVENTOR
Charles G. Roper.
Arno G. K. Wilkens.
BY Darby & Darby
Attys.

Aug. 14, 1951     C. G. ROPER ET AL     2,564,175
ELECTRONIC MEASUREMENT MEANS AND CONTROL DEVICE
Filed April 16, 1946     6 Sheets-Sheet 4

INVENTOR.
Charles G. Roper
BY Arno G. K. Wilkens.
Darby & Darby
Attys.

Aug. 14, 1951  C. G. ROPER ET AL  2,564,175
ELECTRONIC MEASUREMENT MEANS AND CONTROL DEVICE
Filed April 16, 1946  6 Sheets-Sheet 5

INVENTOR.
Charles G. Roper
Arno G. K. Wilkens
BY
Darby & Darby
Att'ys.

Patented Aug. 14, 1951

2,564,175

UNITED STATES PATENT OFFICE 2,564,175

ELECTRONIC MEASUREMENT MEANS AND CONTROL DEVICE

Charles G. Roper, Fairfield, and Arno G. K. Wilkens, Shelton, Conn., assignors to Manning, Maxwell & Moore, Inc., Bridgeport, Conn., a corporation of Connecticut Application April 16, 1946, Serial No. 662,526

5 Claims. (Cl. 236—69)

1

The present invention relates to electromechanical means including an electronic transmission system for measuring displacements representative of variable such, for example, as temperatures, pressures, liquid levels and the like.

The primary object of this invention is the provision of an apparatus and a method by means of which the physical displacements of a member in response to temperature or pressure changes, liquid levels, flow of fluids and similar variables may be converted by means of an electronic system into electric currents or voltages directly proportional to such displacements and these currents or voltages, in turn, converted into accurate, visible indications of the quantitative values of the variables or employed through control devices to maintain the variables at desired values or to cause operation of limit switches at desired predetermined values.

Another object of the invention is to provide a sensitive member which is displaced in accordance with the value of a variable.

A still further object of the invention is to provide such a sensitive displacement member in the form of a Kelvin balance in which electromagnetic forces are balanced against a spring loading or in some instances, against a pressure loading.

A still further object of the invention is to provide means whereby the movement of the displacement member is effective to alter the output of an electronic oscillator to thereby produce currents proportional to the movement of the displacement member and of the variable measured.

A still further object of the present invention is to provide such a displacement measuring or sensing member with means for feeding back a portion of the output current from the associated electronic oscillator in such a manner as to assure that the variations of the displacement member will result substantially only from changes in the measured variable.

Other objects and features of the invention will be apparent when the following description is considered in connection with the annexed drawings in which—

2

Figure 1:
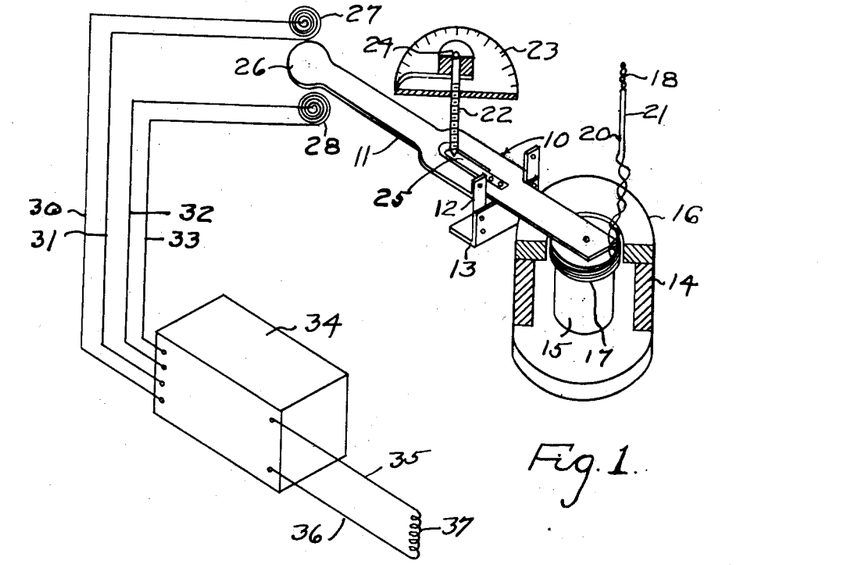
Figure 1 is a diagrammatic showing of one form of our invention applied in this instance to the limiting of furnace temperatures. In this figure the Kelvin balance mechanism or senser is shown in a simple form in order to illustrate the principles of operation.

Referring now to the drawings, and particularly to Figure 1 there is shown at 10 a balance which comprises a beam 11 resiliently fastened by means of the upstanding members 12 to a fixed frame 13. Located adjacent one end of the beam 11 is a permanent magnet structure 14 having a central pole piece 15 and an annular pole piece 16. In the annular gap between members 15 and 16 there is located a moving coil 17 which is fastened to the beam 11 adjacent its right hand end. A thermocouple 18 which may be located in the stack of a furnace or any other location subjected to a temperature which it is desired to regulate, is connected by means of the conductors 20 and 21 to the coil 17.

Fixedly mounted on the side of the supporting member 13, remote from the moving coil 17, is a screw 22 which cooperates with a fixed dial plate 23 and may be turned by means of the handle 24. This screw bears against a resilient tongue 25 of the beam 11 and thus, by adjustment of the handle or knob 24, the beam may be spring loaded.

The far left end 26 of the beam 11 is formed as a vane or "flag" and moves between two spiral coils 27 and 28 such movement serving to vary the effective inductance of the coils.

Coils 27 and 28 are connected by means of the conductors 30, 31 and 32, 33 to the oscillator-amplifier unit 34, the output terminals of this unit being connected in turn by means of conductors 35 and 36 to the coil 37 of a relay which is so connected in the circuit of the furnace burner as to cause deenergization of the burner upon the furnace temperature, as measured by the thermocouple 18, reaching a preset maximum value.

Figure 2:
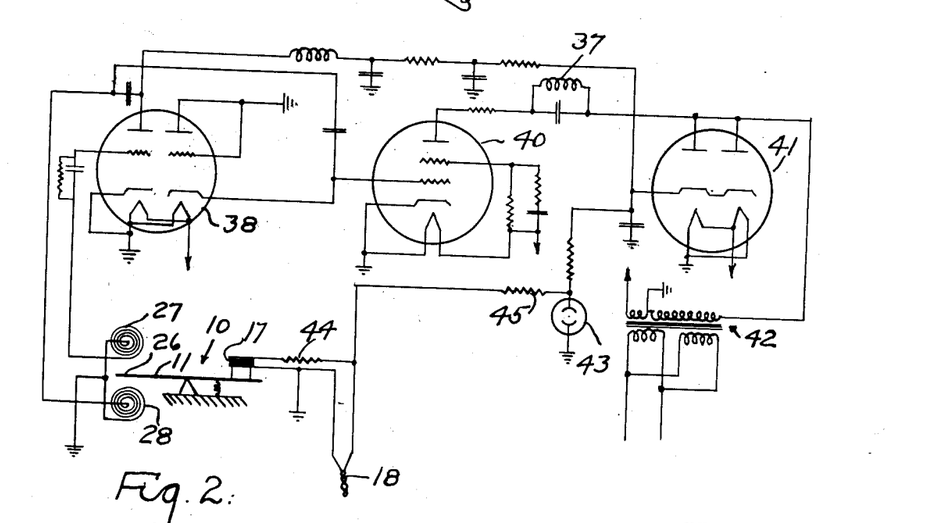
Figure 2 is a schematic wiring diagram of the arrangement of Figure 1 showing particularly the mode of utilizing the electronic oscillator and its associated amplifier and supply rectifier.

In Figure 2, the sensor 10 is shown in an extremely schematic form and the details of connection of the oscillator-amplifier unit 34 are illustrated. The oscillator-amplifier unit just mentioned comprises the electronic discharge tubes 38, 40 and 41. Tube 38 is a twin triode, one-half of which is connected as an oscillator having coil 27 in its grid circuit and coil 28 in its plate circuit. The coupling between the two circuits is effected by means of the inherent capacity of the tube 38.

The output from the left-hand section of the tube is coupled to the control grid of the tube 40, this tube being a thyratron and being connected so that the cathode grid circuit thereof, together with the right hand diode connected section of the twin triode 38, forms a voltage doubling circuit comprised of the two rectifiers just mentioned. The shielding grid of the amplifier thyratron 40 is biased negative to thereby give positive control characteristics to the control grid. Plate current is supplied to the thyratron 40 from the secondary of the transformer 42. Plate current is supplied to the twin triode 38 from the rectifier 41 which is connected in a conventional manner which is indicated in Figure 2. The plate current lead to the thyratron passes through winding 37 of the control relay mentioned in connection with Figure 1.

The circuit of Figure 2 is so designed as to immediately cause opening of the contacts of relay 37 and a shutdown of burner operation upon any failure in the system as will be clear from the following description of the operation of the circuit.

The sensor beam 11 is spring loaded to tune the oscillator comprising the left hand element of tube 38 for maximum output at the predetermined temperature. When the thermocouple is energized to increase the current through coil 17 the beam moves and thus, through the change in the position of the "flag" 26, alters the output of the oscillator. When the oscillator is normally operating with the magnetic forces on the beam balancing the spring load, the positive output thereof keeps the thyratron in conductive condition and causes a current flow through the relay winding 37. Thus, when the temperature becomes greater than the predetermined limit, the positive output from the oscillator applied to the control grid of the thyratron 40 falls off and the negative bias on the screen of the tube 40 causes the tube to be rendered non-conductive. Thereupon, current flow through the relay winding 37 ceases and the burner is immediately disconnected.

Should the oscillator fail, it will be clear that the positive bias to the control grid of the thyratron will be removed and the thyratron will then cease to conduct, again causing a shutdown of the burner. Furthermore, should the rectifiers comprising the right hand diode connected section of member 38 and the grid-cathode circuit of the thyratron 40 fail to perform their function, the positive bias will be removed from the thyratron 40 and again the burner will be caused to shut down.

Another possibility of failure exists in the fact that the thermocouple circuit may become open. In order to provide for a shutdown of the apparatus if this should occur a neon lamp 43 is provided to produce a regulated voltage in parallel across which the thermocouple 18 and the moving coil 17 in series with a resistance 44 are connected, the values of the series resistance 44 and the resistance of the coil 17 being such that if the thermocouple becomes open circuited the current applied through the coil 17 is sufficient to so displace the beam 11 as to reduce the output of the oscillator to the point where it, in turn, renders the thyratron 40 non-conductive and causes a shutdown of the burner in the manner hereinabove described.

Figure 3:
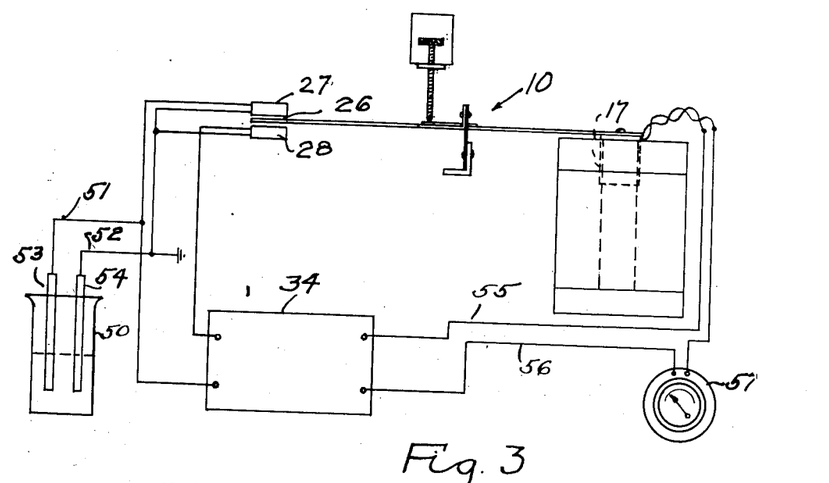
Figure 3 is a diagrammatic showing of the application of the senser to the measurement of liquid level, illustrating particularly the feeding back of a portion of the oscillator output to the electromagnetic displacement member operating means in order to establish a constant zero reference point and stabilize the indication, thereby minimizing the effect of unmeasured variables such as variations in tube emission, ambient temperature and power supply voltage.

In Figure 3 the sensor 10 is shown as applied to a mode of measuring the liquid level in a container 50. In this case the sensor 10 is in all respects similar to that illustrated in connection with Figures 1 and 2. However, in this instance, the coils 27 and 28 are connected, respectively by means of conductors 51 and 52 to the plates 43 and 54 which together comprise a condenser. The plates 53 and 54 are inserted in the container 50 and protrude into the liquid therein. Thus, as the liquid level rises and falls the dielectric between the plates is altered and consequently the capacity of the condenser is altered. Such alteration of condenser capacity is, of course, effective to change the output of the oscillator-amplifier 34. The output of the oscillator-amplifier unit 34 is fed by means of conductors 55 and 56 through an ammeter 57 to the moving coil 17 of the sensor 10. Meter 57 is calibrated in terms of liquid level and thus, a continuous indication of the level in the container 50 is given.

Additionally, the application of the output of the oscillator-amplifier unit 34 to the coil 17 stabilizes the indication of the meter 57 since, as the dielectric level in the container 50 changes the capacitance of the condenser and tends to throw the circuit out of resonance, the resulting change is effective to alter the position of the "flag" 26 and thus, partially counterbalance the effect of the change in capacitance. This will be clearer when the details of the circuit are described in connection with Figure 4.

Figure 4:
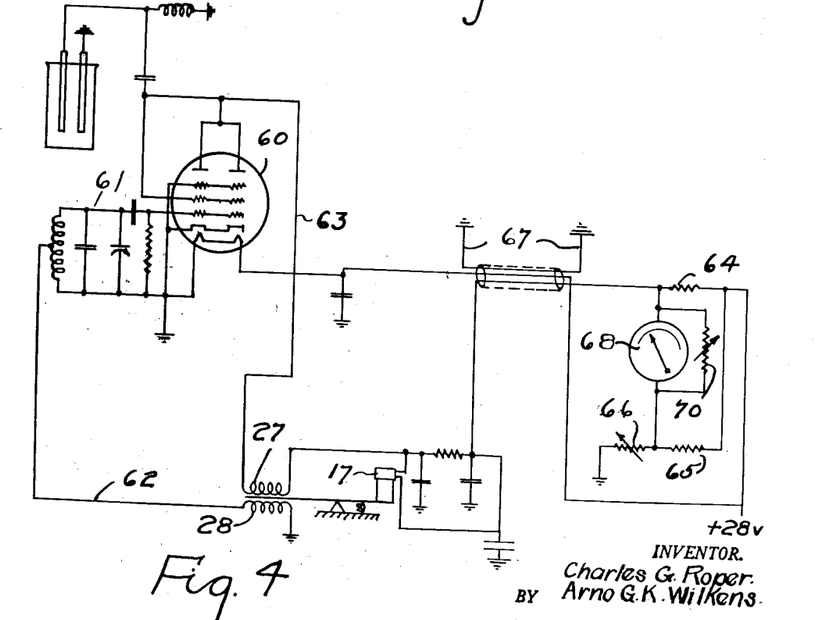
Figure 4 is a schematic wiring diagram of the device of Figure 3 showing the details of connection of a form of oscillator suitable for use with the liquid level measuring device of Figure 3.

In the circuit of Figure 4 the oscillator 34 is a pentode tube 60 having its plate and grid circuits coupled in the normal manner and having the plates 53 and 54 of the condenser which comprises the liquid level measuring unit arranged to tune the oscillator for resonance. As will be seen by reference to Figure 4 the oscillator 60 is one arm of a bridge network comprising the resistors 64, 65 and 66 and the plate current is supplied to the oscillator through the sensor coil 17 in series with the coil 27. In Figure 4 a ground connection has been indicated at 67 merely to illustrate that the meter 68 may be located remotely from the remaining equipment but that in such case the ground connection should be carried from one unit of the equipment to the other. Meter 68 is shunted by a resistance 70 in order to provide means for adjusting and calibrating the meter. It will be seen that by utilizing the circuit above described a constant reference point for the meter indication is produced. This results from the fact that the senser, due to the flow through coil 17, is utilized to tune the oscillator input and thus, the senser establishes a zero indication based on a definite current flow in the coil 17 of the senser.

As the current in the coil 17 increases flag 26 is driven to tune the input and thereby reduce the coil current and thus tends to prevent a change in output current. In other words, the senser acts as a degenerative link in the circuit and stabilizes the indications by minimizing the effect of unmeasured variables such as tube emission, ambient temperature effects and variations in power supply voltage.

Figure 5:
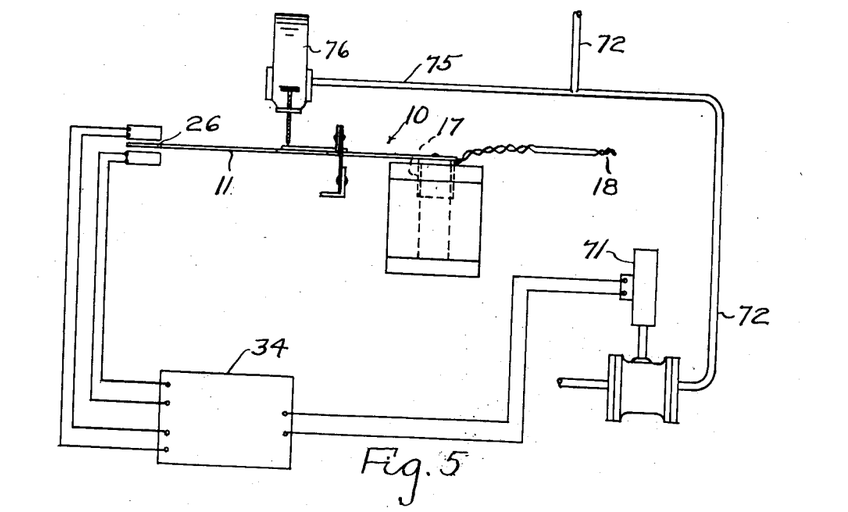
Figure 5 is a diagram showing the application of the balance or senser to the regulation of temperature as exerted through the pressure regulation of the fuel supply of a burner or the like. This figure likewise shows the mode of applying a regulated pressure to the senser in order to stabilize the regulation and increase the accuracy of the temperature regulation, this being accomplished by readjusting the operating point of the senser.
Figure 6:
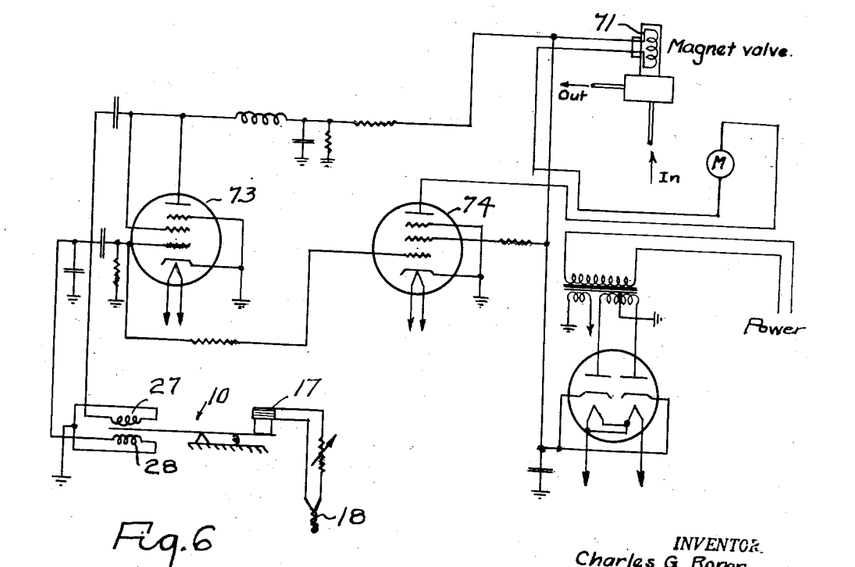
Figure 6 is a schematic wiring diagram illustrating a type of oscillator and amplifier which may be utilized in connection with the temperature-controlled pressure regulator of Figure 5.

Another mode of utilizing the general principles of our invention and likewise utilizing the sensing mechanism of our invention is illustrated in Figures 5 and 6. In this application the principles are applied to the regulation of pressure in a hydraulic system in accordance with temperature over a definite temperature range. Actually the valve utilized does not directly regulate pressure, but rather regulates the flow in a hydraulic system provided with an orifice. This arrangement may be utilized, for example, to regulate the pressure in a gas turbine in accordance with the combustion temperature. Referring to Figure 5 there is shown therein the thermocouple 18 which is connected to the coil 17 of the senser 10 to thereby cause variations in the position of the beam 11 in accordance with currents flowing in the thermocouple. As in the devices previously described movement of the beam 11 and its "flag" 26 are effective to cause variations in the tuning of the oscillator-amplifier unit 34. In this instance, the output of the amplifier-oscillator unit is fed to a solenoid controlled valve 71 which valve is in the pressure line 72 to be regulated. By this means, the position of the valve is determined in accordance with the temperature applied to the thermocouple 18 and therefore the pressure in the line 72, which may be the hydraulic line of a servomechanism, is regulated. Of course, the servomechanism may be designed to control the feeding of fuel to a device such as a gas turbine thereby governing the temperature applied to the thermocouple 18. When the magnetic force of the current in coil 17 exceeds the load applied to the beam 11 by means of the spring and otherwise as will be shortly described, the beam moves to vary the tuning of the oscillator and this effect is amplified to operate the solenoid valve and regulate the pressure. The operation of the device of Figure 5 will be clearly seen when Figure 6 is considered.

In this figure the oscillator-amplifier unit 34 comprises the two pentodes 73 and 74, the first of which is arranged as an oscillator with the coils 27 and 28 of the senser 10 in the tuning circuits thereof. The output of this oscillator is fed to the control grid of tube 74, the output of which, in turn, is fed to the magnet valve 71. In this case as is seen more clearly by referring back to Figure 5 the controlled pressure is supplied by means of a conduit 75 to a Bourdon spring or tube 76 and is added to the spring loading on the beam 11 of the senser 10. The senser beam is preloaded by means of the spring to give maximum oscillation of the oscillator 73 and consequently a minimum flow and maximum pressure in the controlled hydraulic system. When the pull of the magnet coil equals or exceeds the preloading of the senser beam the output of the oscillator 73 is reduced, thus permitting an increase of current flow in the solenoid of the valve 71 and a reduction of pressure in the hydraulic system which as has been described controls the temperature.

The hydraulic pressure is measured with the Bourdon spring 76 which is connected to the senser to vary the control point oppositely to the variation effected by the current in thermocouple and senser coil 17. This again comprises a degenerative linkage which insures that changes in pressure are the function of changes in thermocouple current and are not due to extraneous variations.

Figure 7:
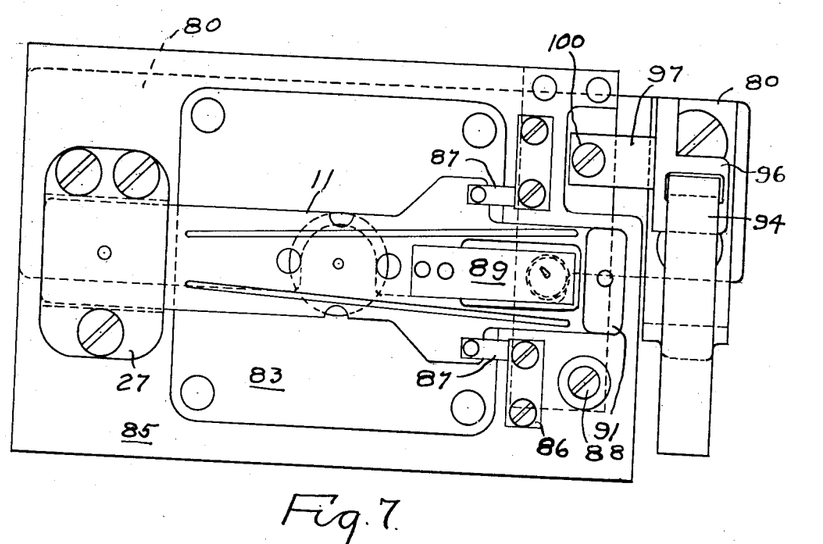
Figure 7 is a top-plan view of a preferred form of balance or senser utilized in connection with the various heretofore mentioned modifications and circuits.
Figure 8:
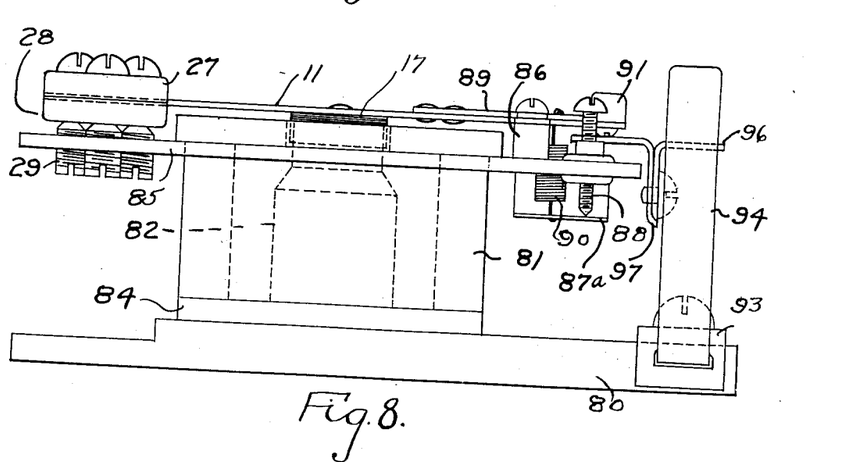
Figure 8 is a side elevation of the senser of Figure 7.
Figure 9:
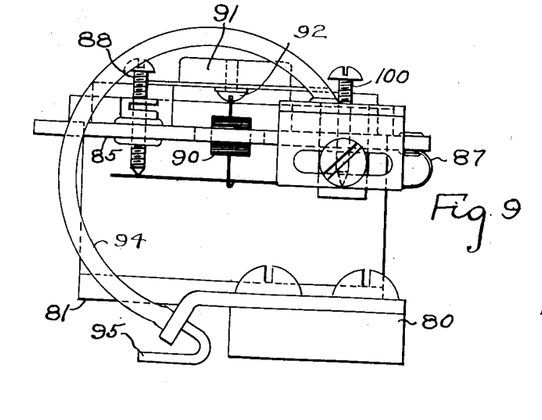
Figure 9 is an end elevation of the senser of Figures 7 and 8.

A particular form of senser which we have found to be very effective in circuits of the type hereinabove described is depicted in Figures 7, 8 and 9. This unit comprises a base 80 on which is mounted a magnetic structure comprising the annular magnet 81 together with a central pole piece 82 and upper and lower plates 83 and 84, the upper plate being provided with a central opening of a size sufficiently large so that an annular gap is formed between it and the upper portion of the central pole piece 82. In this gap the moving coil 17 is situated, being fastened to the beam 11 in any suitable manner. Clamped between the magnet 81 and the upper pole piece or plate 83 is a supporting member 85 which carries near its right hand end as seen in Figures 7 and 8 a block 86 to which resilient ribbons 87 are fastened, these ribbons being fastened at their opposite ends to the senser beam 11 to thereby pivotally support the beam.

The plate 85 at its left hand end supports the coils 27 and 28 previously described, the position of these coils being adjustable by means of the screws 29 as is clearly seen in Figure 8. At its right hand end the plate 85 carries a resilient member 87ª which lies beneath the plate 85 and extends to the left as seen in Figure 9, this member being adjustable by means of a screw 88 extending downwardly through the plate and having its point in contact with the member 87. Stretched between the central portion of member 87 and a tongue 89 extending from the beam 11 is a coil spring 90 which applies a load to the beam 11 to preload that beam. For balancing purposes there is provided a weight 91 which is fastened to the beam 11 at its right hand end as seen in Figures 7 and 8, being conveniently screwed to the beam by means of the screw 92.

In utilizing the senser in circuits such as those in Figures 2 and 4, the structure just described is sufficient. However, when it is desirable to modify the loading of the senser in accordance with the hydraulic pressure present in a controlled system as described in connection with Figures 5 and 6 the additional mechanism about to be described will be combined with the senser mechanism.

Fixed to the base 80 at its right hand end is a bracket 93 to which a Bourdon tube or spring 94 is fastened in any suitable manner and to which likewise is fastened a fitting 95 suitable for the connection of a hydraulic pressure line thereto. The Bourdon tube is in the form of a partial circle as is customary and is fixed at its upper end to an angle plate 96, the depending leg of which is adjustably secured to a similar angle plate 97. The horizontal leg of the plate 97 has extending therethrough a screw 100 which bears upon the resilient member 87. Thus, as the Bourdon tube is expanded, the loading upon the spring 90 is decreased and conversely as the tube is contracted the loading is increased.

Consequently, when the pressure in the line 72 and 75 of Figure 5 increases the loading of the beam 11 is decreased and when the pressure decreases the loading is increased. As will be clear by reference to the figures the effective lever arm may be adjusted by adjusting the horizontal position of angle member 97 with respect to that of angle member 96 and the effectiveness of the movement of the Bourdon tube 94 upon the resilient member 87 may be determined by adjustment of screw 100. Moreover, the preloading of the beam 11 by the spring 90 is controlled according to the position of the screw 88 with respect to supporting plate 85.

Figure 10:
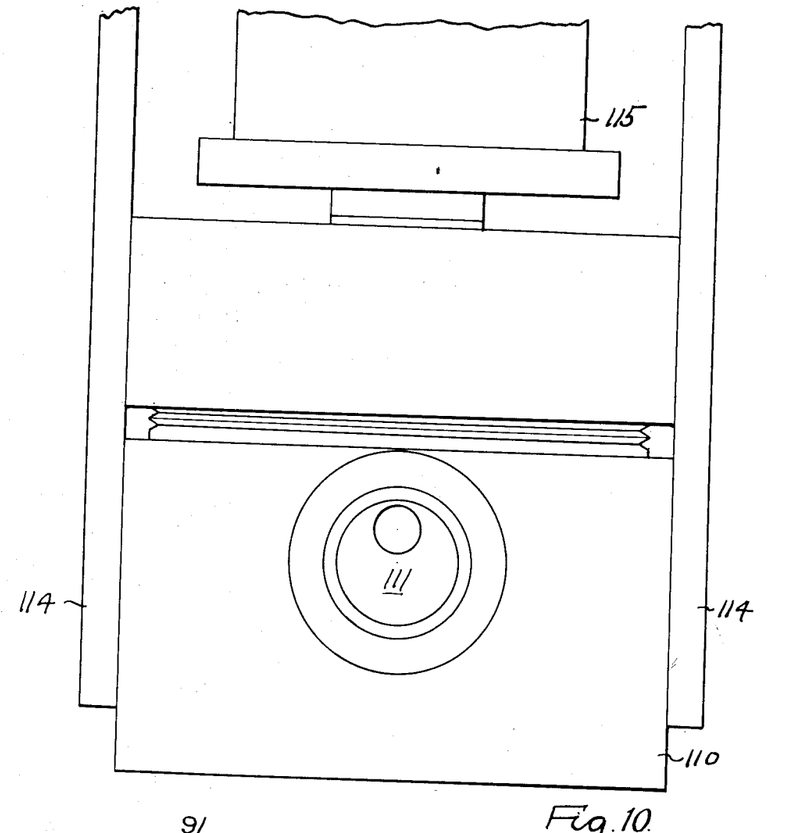
Figure 10 is a front elevation of a solenoid controlled valve, particularly designed and adapted for use in the regulator of Figures 5 and 6.
Figure 11:
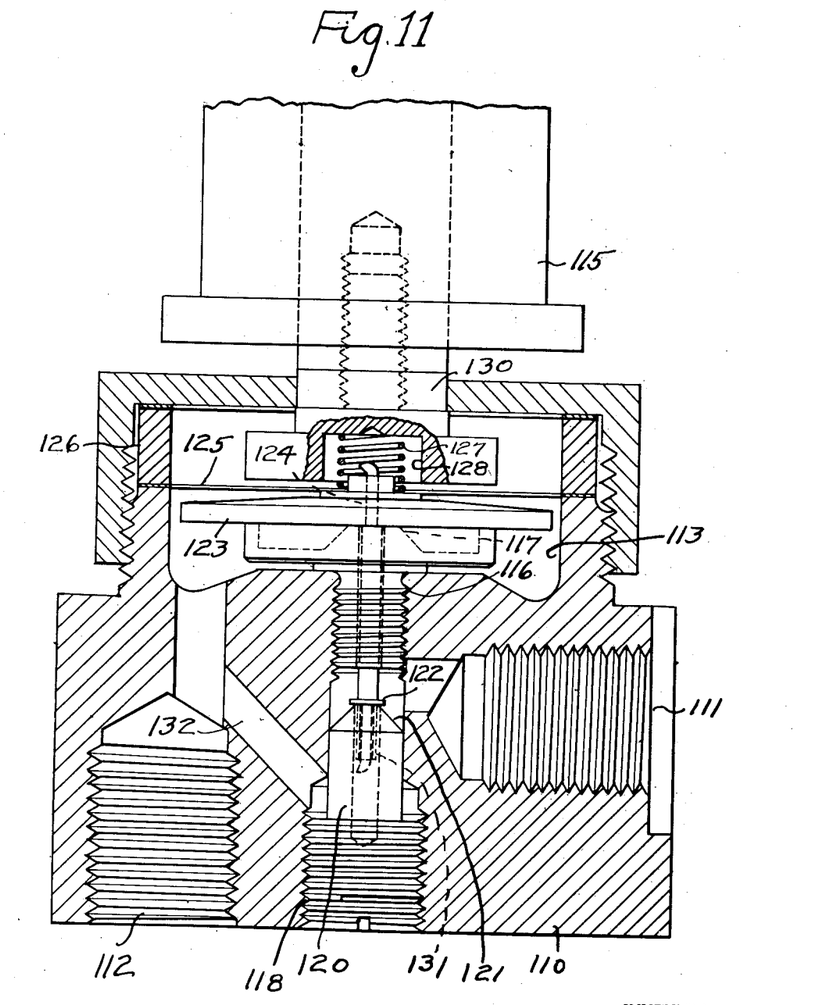
Figure 11 is a vertical central cross section of the valve of Figure 10 taken on the plane at right angles to that of that figure.

In the system described in connection with Figures 5 and 6 the valve is preferably one in which the opening and closing thereof is proportional to the current in the operating solenoid. A preferred embodiment of valve is illustrated in Figures 10 and 11.

Referring now to these figures there is shown at 110 a valve base having an inlet port 111 and an outlet port 112 therein as well as a valve chamber 113. Fixed to the base 110 are the arms or yoke structure 114 which extend upwardly and support the solenoid structure 115. The valve base 110 is drilled and tapped at 116 and provides a support for a valve seat 117 which is screwed into the tapped hole 116. Likewise, the base is drilled and tapped at 118 to provide an adjustable support for a valve seat member 120. Cooperating with the seat 121 of the member 120 is a valve disk 122 while cooperating with the upper valve seat 117 is a valve disk member 123. The valve disks 122 and 123 are mounted on a valve rod 124 which rod is fastened to the diaphragm 125 for movement therewith. Diaphragm 125 is clamped between the upper section of base 110 and a clamping ring 126 so that the diaphragm is fixedly held at its periphery. This diaphragm is perforated so that there will be equal hydraulic pressure on both sides thereof.

Bearing upon the central portion of diaphragm 125 is a light coil spring 127 which extends from the diaphragm into a cup-shaped portion 128 of the core 130 of the solenoid 115. The valve rod 124 is provided with a sleeve 131 at the lower part thereof and extending into the passageway in the valve seat member 120 the sleeve being of such a diameter that the passageway about it is of the same cross section as the passageway surrounding the major portion of the valve rod 124 and extending upwardly to the seat member 117. Consequently, the flow through the two valves is necessarily identical and the structure is pressure balanced.

By virtue of the use of the diaphragm 125 the valve movement is proportional to the current flowing in the winding of the solenoid 115. As is well known, the pull on a magnetic armature increases as the gap diminishes and as is likewise well known the resistance to movement of a diaphragm increases as the diaphragm is deformed.

By the present arrangement as the gap decreases the diaphragm becomes more deformed and consequently as the pull increases so also does the resistance thereto. Due to this arrangement and of course to the proportioning of the parts the valve movement for a particular current change is substantially constant without regard to the initial setting. Moreover, a small coil spring 127, Figure 11, is provided which is in essence a portion of the diaphragm 125 and acts to bias the valve as may be desired.

Furthermore, by constructing the valve in the mode previously described, the valve is balanced with respect to the hydraulic pressures exerted thereon and there is no upsetting of the action which might result if a single orifice was provided.

As is clear by reference to Figure 11 the flow of hydraulic pressure fluid through the valve is from the inlet port 111, thence through the valves 122 and 123 upwardly into the valve chamber 113 and downwardly into the valve chamber formed in member 120 and thence, from here through a passageway 132 and again to the chamber 113. From chamber 113 the fluid passes to the outlet port 112.

As has been stated the valve structure just above described is particularly efficient in connection with Figures 5 and 6. Thus, as the output from the oscillator-amplifier unit 34 is varied the position of the valve is accordingly varied and causes adjustment of pressure is hydraulic lines 72. The pressure in these lines is measured by the Bourdon spring which then readjusts the operating point of the senser and consequently of the oscillator-amplifier unit 34. Thus, if the valve is opened to too great an extent the pressure drop becomes excessive and the Bourdon spring immediately resets the senser in such a manner as to reduce the valve opening, thereby causing the pressure drop to be proportional to the current in the thermocouple.

Preferably, in this system, the senser beam 11 is adjusted by means of the screw 88 so that maximum oscillation of the oscillator 73 of Figure 6 occurs. When the pull of magnetic coil 17 equals or exceeds the preloading the alternating current output voltage of the oscillator 73 is reduced, and since the voltage is rectified and applied as negative grid bias to the amplifier 74 there is an increase of current flow in the solenoid 115 of valve 71, resulting in reducing the pressure in the hydraulic lines 72. Such reduction of pressure causes the Bourdon spring to increase the loading on the beam 11 and thus causes readjustment of the beam to maintain the pressure at the new value.

While we have described preferred embodiments of our invention and preferred circuits for applying the principles thereof, it will be understood that various modifications may be made and that other forms of the senser and valve units may be utilized. Therefore, we wish to be limited not by the foregoing description which was given for purposes of illustration only but on the contrary wish to be limited solely by the appended claims.

What is claimed is:

1. In an electromagnetic system for controlling a variable, in combination, an electromagnetic balance comprising a pivoted beam having an electro-dynamic coil fixed thereto, said electro-dynamic coil cooperating with the field of a permanent magnet and said beam being provided with a vane, means to apply an input to said coil in accordance with the value of the controlled variable, an oscillator having input and output circuits, a tuning coil in at least one of said circuits, said tuning coil being located adjacent said vane, whereby movement of said beam and vane varies the effective inductance of said coil to thereby tune said oscillator in accordance with the value of the variable, means in the output circuit of said oscillator for controlling the value of a regulating variable and means for varying the loading of said balance beam in accordance with the value of said regulating variable.

2. In an electro-mechanical system for controlling the temperature in a heated zone by controlling the pressure in a hydraulic system governing the supply of fuel to the heat producer, in combination, an electro-mechanical balance comprising a pivoted beam and an electro-dynamic coil fixed to said beam, said coil being moveable in a magnetic field and said beam having means for varying the loading thereof to modify the controlling point, a source of output current variable in accordance with the position of said beam, means for regulating the pressure in said hydraulic system in accordance with the output current and means for varying the pressure loading of said beam in accordance with the pressure in said hydraulic system.

3. In an electro-mechanical system for limiting the temperature in a heated zone by controlling the pressure in a hydraulic system governing the supply of fuel to the heat producer, in combination, an electro-mechanical balance comprising a pivoted beam and an electro-dynamic coil fixed to said beam, said coil being moveable in the field of a fixed permanent magnet and said beam having means for varying the loading thereof to modify the limiting point, a source of output current variable in accordance with the position of said beam, means for regulating the pressure in said hydraulic system in accordance with the output current and means for varying the pressure loading of said beam in accordance with the pressure in said hydraulic system.

4. In an electro-mechanical system for limiting the temperature in a heated zone by controlling the pressure in a hydraulic system governing the supply of fuel to the heat producer for the zone, in combination, an electro-mechanical balance comprising a pivoted beam and an electro-dynamic coil fixed to said beam, said coil being moveable in the field of a fixed permanent magnet and said beam having means for varying the loading thereof to modify the limiting points, an oscillator having input and output circuits, a vane mounted on said balance beam, inductance coils mounted adjacent said beam, said coils being connected in the input and output circuits of said oscillator to vary the output thereof in accordance with the vane position, temperature responsive means located in the heated zone and connected to said electrodynamic coil, an amplifier connected in the output circuit of said oscillator, a flow control valve connected in the hydraulic system, said valve serving to regulate the pressure in said hydraulic system, means connected in the said output circuit of said amplifier for controlling the position of said valve and means for applying the pressure in said hydraulic system to said beam to load said beam in accordance with the pressure in said system whereby the adjustment of said pressure regulating valve depends upon the temperature to which said temperature responsive means is subjected and other variations are minimized by virtue of the variations in loading imposed on said beam by said pressure means.

5. In an electromagnetic system for controlling a variable at any point in the control range of the system, the combination comprising a pivoted metallic beam having an electrodynamic coil fixed thereon, means for producing a fixed magnetic field in which said coil moves along the axis of said field, means for supplying a current to said coil in response to changes in the controlled variable, an oscillator having an input and an output circuit, a tuning coil in at least one of said circuits positioned adjacent one end of said beam, means operated by said output circuit for controlling said variable, and means including a resilient member connected to the beam for placing a load on said beam to predetermine said control point.

CHARLES G. ROPER.
ARNO G. K. WILKENS.

REFERENCES CITED

The following references are of record in the file of this patent:

UNITED STATES PATENTS

| Number | Name | Date |
|---|---|---|
| 400,515 | Thomson | Apr. 2, 1889 |
| 2,016,317 | Dahl | Oct. 8, 1935 |
| 2,188,628 | Freysted | Jan. 30, 1940 |
| 2,223,986 | Eaton | Dec. 3, 1940 |
| 2,228,163 | Cohen | Jan. 7, 1941 |
| 2,310,298 | Kuhl et al. | Feb. 9, 1943 |
| 2,411,247 | Cohen | Nov. 19, 1946 |